United States Patent
Kneer et al.

(10) Patent No.: US 12,544,968 B2
(45) Date of Patent: Feb. 10, 2026

(54) CONTAINER CONSISTING OF A RIGID OUTER CONTAINER AND A DEFORMABLE INNER BAG, AND A METHOD FOR PRODUCING SUCH A CONTAINER

(71) Applicant: Gaplast GmbH, Altenau (DE)

(72) Inventors: Stephan Kneer, Farchant (DE); Roland Kneer, Farchant (DE); Kasim Yilginc, Oberammergau (DE)

(73) Assignee: Gaplast GmbH, Altenau (DE)

( * ) Notice: Subject to any disclaimer, the term of this patent is extended or adjusted under 35 U.S.C. 154(b) by 465 days.

(21) Appl. No.: 17/884,041

(22) Filed: Aug. 9, 2022

(65) Prior Publication Data
US 2023/0054766 A1 Feb. 23, 2023

(30) Foreign Application Priority Data

Aug. 23, 2021 (DE) ...................... 10 2021 121 806.3

(51) Int. Cl.
*B29C 49/00* (2006.01)
*B29C 49/04* (2006.01)
(Continued)

(52) U.S. Cl.
CPC .......... *B29C 49/04* (2013.01); *B29C 49/0005* (2013.01); *B29C 49/071* (2022.05);
(Continued)

(58) Field of Classification Search
CPC ..................................... B29C 49/00
See application file for complete search history.

(56) References Cited

U.S. PATENT DOCUMENTS 4,568,261 A * 2/1986 McHenry ................ B32B 27/32
264/328.8
6,045,492 A 4/2000 Brendel et al.
(Continued)

FOREIGN PATENT DOCUMENTS

CA        2258853 A1    1/1998
CN      108674772 B     6/2021
(Continued)

OTHER PUBLICATIONS

Ajji, A. (1995), Morphology and mechanical properties of virgin and recycled polyethylene/polyvinyl chloride blends. Polym Eng Sci, 35: 64-71. (Year: 1995).*
(Continued)

*Primary Examiner* — JaMel M Nelson
*Assistant Examiner* — Erica Hartsell Funk
(74) *Attorney, Agent, or Firm* — Greer, Burns & Crain, Ltd

(57) ABSTRACT

The method for producing a container consisting of a rigid outer container and a deformable inner bag. A first screw conveyor supplies a first thermoplastic plastics material for the outer container and at least a second and a third screw conveyor supplies at least a second and a third thermoplastic plastics material for the inner bag to an extruder which coextrudes a parison consisting of at least the first, second and third layers. The parison is inflated by a pressure medium to bring it into contact with the wall of the blow mould, where excess material below the welded seam is cut off and the container is removed from the blow mould. The second thermoplastic plastics material forming the outer layer of the inner bag consists of a material which, in the hardened state, has a rough surface having microscopically small elevations and depressions.

4 Claims, 1 Drawing Sheet

Outer layer

Detaching layer; innovation

(51) Int. Cl.
  *B29C 49/22* (2006.01)
  *B29C 49/42* (2006.01)
  *B65D 77/06* (2006.01)
  *B65D 83/00* (2006.01)
  *B29K 23/00* (2006.01)
  *B29K 509/08* (2006.01)
  *B29L 31/00* (2006.01)

(52) U.S. Cl.
  CPC .......... *B29C 49/22* (2013.01); *B29C 49/4283* (2022.05); *B65D 77/06* (2013.01); *B65D 83/771* (2025.01); *B29C 2949/3044* (2022.05); *B29C 2949/3094* (2022.05); *B29K 2023/086* (2013.01); *B29K 2509/08* (2013.01); *B29L 2031/712* (2013.01)

(56) References Cited

U.S. PATENT DOCUMENTS

| | | |
|---|---|---|
| 7,585,452 B2 | 9/2009 | Kneer |
| 7,837,927 B2 | 11/2010 | Morel et al. |
| 9,205,952 B2 | 12/2015 | Maas et al. |
| 10,364,087 B2 | 7/2019 | Kneer et al. |
| 10,882,240 B2 | 1/2021 | Chen |
| 2009/0208718 A1* | 8/2009 | Stoll .................... B32B 27/36 428/220 |
| 2013/0161341 A1* | 6/2013 | Kneer .................... B65D 37/00 222/105 |
| 2014/0239002 A1* | 8/2014 | Miyajima .................... B26F 1/02 264/156 |
| 2016/0375624 A1* | 12/2016 | Culeron .................... B29C 49/04 264/403 |
| 2017/0029156 A1 | 2/2017 | Eguchi et al. |
| 2018/0016050 A1 | 1/2018 | Tetsuaki et al. |
| 2018/0334310 A1* | 11/2018 | Kneer .................... B65D 77/00 |

FOREIGN PATENT DOCUMENTS

| | | |
|---|---|---|
| CN | 110817053 B | 6/2021 |
| DE | 603 09 069 T2 | 5/2007 |
| DE | 10 2017 004 657 A1 | 5/2017 |
| EP | 1996384 B1 | 3/2011 |
| EP | 2851308 B1 | 7/2017 |
| WO | WO2004050362 A1 | 6/2004 |

OTHER PUBLICATIONS

European Search Report dated Jan. 9, 2023 for European Application No. EP22186499.

* cited by examiner

Outer layer

Detaching layer; innovation

1 Polypropylene

2 Innovation

3 Surlyn; Purell or Dowlex

CONTAINER CONSISTING OF A RIGID OUTER CONTAINER AND A DEFORMABLE INNER BAG, AND A METHOD FOR PRODUCING SUCH A CONTAINER

PRIORITY CLAIM

The subject application claims convention priority to German patent application No. DE 10 2021 121 806.3, filed Aug. 23, 2021.

BACKGROUND

The invention relates to a method for producing a container consisting of a rigid outer container and a deformable inner bag which consists of at least two layers, wherein the material layer facing towards the outer container does not enter into a welded connection with the material of the outer container, wherein in the method a first screw conveyor supplies a first thermoplastic plastics material for the outer container and at least a second and a third screw conveyor supply at least a second and a third plastics material for the inner bag to an extruder which coextrudes a parison consisting of at least the first, second and third layers, which parison is arranged between the opened halves of a blow mould, wherein the blow mould is closed once the parison has the length required for producing the container, wherein excess material in the base region of the container to be produced is pinched off and a web composed of material of the outer container is formed in which the welded base seam of the inner bag is clamped, and wherein the parison is inflated by a pressure medium in order to bring it into contact with the wall of the blow mould, the excess material below the welded seam is cut off and the container is removed from the blow mould.

Such a method is known, for example, from DE 196 26 967 C2. That publication also discloses that at least one wall opening is formed in the outer container by drilling through or puncturing the wall of the outer container using a drill, cutting tool or a piercing needle and, once the wall of the outer container has been fully penetrated, a pressure medium is blown or sprayed against the wall of the inner bag in order to push it back so that it is not damaged by the drill or the piercing needles. On discharge of the container contents from the inner bag, ambient air flows through the wall opening into the intermediate space between the outer container and the inner bag for the purpose of equalising pressure.

Although the different types of thermoplastic plastics material of the outer container and the inner bag do not enter into a welded connection with one another, they adhere to one another if the container is produced in a coextrusion process in accordance with the method described above. Before such a container is ready to use, that is to say before it is filled with liquid or, for example, paste-form container contents which are then gradually discharged, for example, by means of an airless pump or by compression of the container, the inner bag must be detached from the wall of the outer container and then brought back into contact therewith. This can be effected by applying a partial vacuum to the inner bag through the container opening, whereupon the bag abruptly contracts. Compressed air is then introduced into the inner bag through the container opening in order to bring the bag back into contact with the outer container. If the inner bag is not detached from the wall of the outer container substantially uniformly, then, despite pressure-equalising openings in the wall of the outer container, a relatively high partial vacuum will occur in the inner bag when filling material is discharged, which may have an adverse effect on the functioning of the pump that is usually provided.

DE 10 2006 012487 A1 discloses an improved detachment method in which, after the outer container has been drilled through, a pressure medium is introduced into the intermediate space between the outer container and the inner bag after the container opening has been sealed, the introduction of the pressure medium into the intermediate space being stopped once a predetermined second pressure threshold has been reached in the inner bag; once the pressure has been relieved a pressure medium is introduced into the inner bag in order to bring the inner bag back into contact with the container wall.

The method steps known hitherto for detaching the inner bag from the container wall and subsequently bringing it into contact with the wall of the outer container are elaborate and increase the production time for ready-to-use containers of the kind under consideration.

The problem underlying the present invention is to define a better solution for this problem.

The invention relates also to a container consisting of a rigid outer container and a deformable inner bag which is in contact with the outer container, having, at the base of the container, a pinch-off seam in which the welded base seam of the inner container is held, wherein the inner bag consists of at least two layers and has not been welded to the outer container during its production in the coextrusion process. In this container the inner bag should be in loose contact, that is to say substantially without adhesion, with the outer container, without pressure-equalising holes being provided in the wall of the outer container.

SUMMARY

The method for producing a container consisting of a rigid outer container and a deformable inner bag. A first screw conveyor supplies a first thermoplastic plastics material for the outer container and at least a second and a third screw conveyor supplies at least a second and a third thermoplastic plastics material for the inner bag to an extruder which coextrudes a parison consisting of at least the first, second and third layers. The parison is inflated by a pressure medium to bring it into contact with the wall of the blow mould, where excess material below the welded seam is cut off and the container is removed from the blow mould. The second thermoplastic plastics material forming the outer layer of the inner bag consists of a material which, in the hardened state, has a rough surface having microscopically small elevations and depressions.

DETAILED DESCRIPTION

Figure 1:
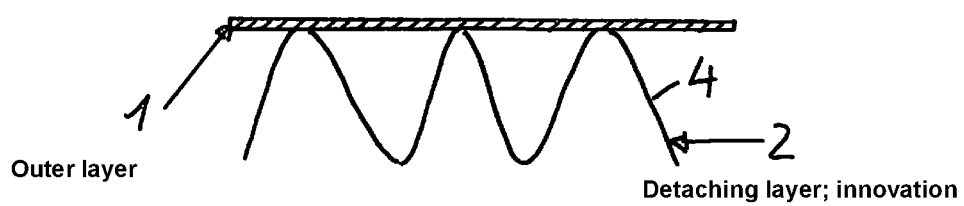
FIG. 1 is a schematic drawing of the present container.

The method according to the invention provides that the second thermoplastic plastics material forming the outer layer of the inner bag, which outer layer is in contact with the outer container, has, in the hardened state, a rough surface having microscopically small elevations and depressions, so that the adhesive forces between the outer container and the inner bag are minimal.

For that purpose, the second screw conveyor is supplied with a material compound which consists of a mixture of EVOH and a plastics material having resilient properties.

The material content composed of EVOH has the property of forming the rough surface on solidification or cooling, but this material has the further property of relatively great rigidity, so that it is not, on its own, suitable for a readily deformable inner bag. For that reason, the material content EVOH is mixed with a uniformly distributed plastics material having resilient properties.

As that resilient material it is especially advantageous to use Surlyn which is present in the disperse phase in the EVOH.

In accordance with a further proposal of the invention, the Surlyn (ionomer) can be mixed with very small glass beads which impart to the Surlyn a non-smooth surface having very low adhesion forces.

In respect of the second material layer, various concentration variants have proved suitable, special emphasis being given to 85 EVOH 15 SY or 52 EVOH or 75 EVOH25SY or 75 PCTG25SY, but further similar material mixtures can also be used for the said purpose.

In addition, the method according to the invention provides that the third material layer, which forms the inner layer of the inner bag and accordingly is the product-contacting layer, consists of Surlyn, Purell or Dowlex, without this list being exhaustive. The third layer can have been welded to the second layer during the coextrusion, it also being possible for a fourth layer to be added to the inner bag during the extrusion operation by means of an associated fourth screw conveyor.

After the inflation of the parison to form an (almost) finished container, the blow mould is opened, the pinch-off seam of the outer container being at least partly pulled or torn open, with the result that an air slot for pressure equalisation is formed which becomes larger during ongoing use of the container. This allows the detachment of the inner bag, which adheres to the outer container only very slightly. For that purpose, the container, once removed from the blow mould, can be pressed in at the sides, preferably with two mutually opposite punches, so that the inner bag, on account of its rigidity, abruptly becomes detached from the outer container. This detachment operation in accordance with the invention is also audibly perceptible in that a loud "plop" is generated. Alternatively, the container can be guided by a clamping conveyor belt.

In comparison with the conventional procedure, such a detachment operation is quick and easy to perform, so that the production time for ready-to-use containers is significantly reduced.

In the container according to the invention, the outer layer of the inner bag that faces towards the outer container has a rough surface having microscopically small elevations and depressions which are imperceptible to the naked eye. The pinch-off seam of the outer container has been at least partly opened, so that air is able to enter the intermediate space between the outer container and the inner bag at both ends.

The inner bag can also be detached from the outer container solely by the partial vacuum during the discharge of container contents.

Especially suitable materials for the outer container of the container according to the invention are PP or PCTG or PET-G or HDPE or PCR or HDPE, without this list being exhaustive. The container according to the invention preferably has a bottle shape.

Figure 2:
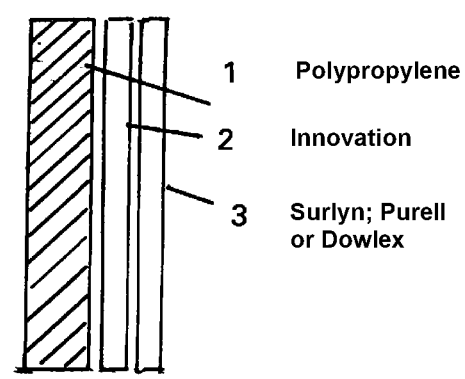
FIG. 2 is a cross-sectional view of extruded layers of the container of FIG. 1.

FIG. 1 shows purely diagrammatically and on a greatly enlarged scale the layer 1 of the outer container and a surface 4 of the readily detachable outer layer 2 of the inner bag. The diagrammatic FIG. 2 shows the extruded layers of the parison, that is to say layer 1 composed of polypropylene, layer 2 composed of an EVOH/Surlyn mixture, and inner layer 3 of the inner bag composed of Surlyn or Purell or Dowlex, without this being a complete list.

The material distribution of a preferred embodiment of the container is: about 80% outer container, 5% outer layer of the inner bag, 15% product-contacting inner layer of the inner bag.

The invention claimed is:

1. A method for producing a container consisting of a rigid outer container and a deformable inner bag, the method comprising:
    supplying a first thermoplastic plastics material for the outer container using a first screw conveyor and at least a second screw conveyor and a third screw conveyor respectively supplying at least a second thermoplastic plastics material and a third thermoplastic plastics material for the inner bag to an extruder, wherein the second screw conveyor is supplied with a material compound which consists of a mixture of ethylene vinyl alcohol (EVOH) and a plastics material having resilient properties, which is mixed uniformly distributed in the ethylene vinyl alcohol (EVOH);
    coextruding a parison consisting of at least a first layer, a second layer and a third layer, where the parison is arranged between the opened halves of a blow mold, wherein the blow mold is closed once the parison has the length required for producing the container, wherein excess material in a base region of the container to be produced is pinched off and a web composed of material of the outer container is formed in which a welded base seam of the inner bag is clamped;
    inflating the parison by a pressure medium to bring it into contact with the wall of the blow mold, the excess material below the welded base seam is cut off and the blow mold is opened, wherein the welded base of the outer container is at least partly pulled or torn open to form an air slot for pressure equalization without pressure equalizing holes in a wall of the outer container, and the container is removed from the blow mold, wherein after the container is removed from the blow mold, the container is pressed in at the sides by punches or a clamping conveyor belt, so that the inner bag becomes detached from the outer container; and
    forming an outer layer of the inner bag, where the outer layer is in contact with the outer container, and consists of a material which, in the hardened state, has a rough surface having elevations and depressions, which decreases adhesive forces between the outer container and the inner bag.

2. The method according to claim 1, wherein the plastics material is mixed with small glass beads.

3. The method according to claim 1, wherein the second layer includes a material mixture that includes the ethylene vinyl alcohol (EVOH).

4. The method according to claim 1, wherein the second layer includes a material mixture that consists of polycyclohexylenedimethylene terephthalate glycol-modified.

* * * * *